United States Patent
Li

(10) Patent No.: US 11,408,552 B2
(45) Date of Patent: Aug. 9, 2022

(54) TABLET AND SMARTPHONE HOLDER FOR VIDEO AND PHOTO SHOOTING

(71) Applicant: Richard Q Li, Ocala, FL (US)

(72) Inventor: Richard Q Li, Ocala, FL (US)

( * ) Notice: Subject to any disclaimer, the term of this patent is extended or adjusted under 35 U.S.C. 154(b) by 0 days.

(21) Appl. No.: 15/648,219

(22) Filed: Jul. 12, 2017

(65) Prior Publication Data

US 2019/0017648 A1    Jan. 17, 2019

(51) Int. Cl.
| | |
|---|---|
| *F16M 11/06* | (2006.01) |
| *G03B 17/56* | (2021.01) |
| *F16M 13/00* | (2006.01) |
| *F16M 11/14* | (2006.01) |
| *F16M 11/04* | (2006.01) |
| *F16M 13/02* | (2006.01) |
| *H04M 1/04* | (2006.01) |
| *H04M 1/02* | (2006.01) |

(52) U.S. Cl.
CPC ........... *F16M 11/06* (2013.01); *F16M 11/041* (2013.01); *F16M 11/14* (2013.01); *F16M 13/00* (2013.01); *F16M 13/022* (2013.01); *G03B 17/561* (2013.01); *G03B 17/566* (2013.01); *H04M 1/04* (2013.01); *H04M 1/0264* (2013.01)

(58) Field of Classification Search
CPC .. F16M 11/06; F16M 11/2021; F16M 11/242; F16M 11/40; F16M 11/041; F16M 13/00; G03B 17/561; G03B 17/566; H04M 1/0264
USPC ......... 248/451, 453, 176.1, 121, 444.1, 457, 248/481, 181.1, 224.7, 288.31, 205.5
See application file for complete search history.

(56) References Cited

U.S. PATENT DOCUMENTS

| | | | | |
|---|---|---|---|---|
| 1,400,217 | A * | 12/1921 | Horger, Jr. | A47B 23/004 248/443 |
| 3,809,352 | A * | 5/1974 | Mathias | A47B 23/042 248/444.1 |
| 5,765,799 | A * | 6/1998 | Weber | A47B 23/044 248/455 |
| 6,386,408 | B1 * | 5/2002 | Beatty | B60R 11/00 24/3.11 |
| 6,729,653 | B1 * | 5/2004 | Greer | B42D 9/00 40/341 |
| 6,942,188 | B2 * | 9/2005 | Tsay | F16B 47/00 248/205.8 |
| 6,981,682 | B2 * | 1/2006 | Kind | A47B 23/042 248/300 |
| 7,748,669 | B2 * | 7/2010 | Lu | H04M 1/04 403/56 |
| 8,459,599 | B2 * | 6/2013 | Du | F16M 13/00 248/181.2 |
| 9,999,297 | B1 * | 6/2018 | Arceta | A47B 23/06 |

(Continued)

OTHER PUBLICATIONS https://www.techrankup.com/en/smartphones-thickness-ranking/. Accessed on Jan. 4, 2022 (Year: 2021).*

(Continued)

*Primary Examiner* — Christopher Garft

(57) ABSTRACT

A tablet or smartphone holding system for video and photo shooting is disclosed. The holder is a clip which has a clear, flat, front panel and a back panel which are joined together by an axis. The axis goes through bases on both the front and back panel and has a spring, which generates pressure to press the back panel toward the front panel, with a tablet or smartphone in between.

1 Claim, 4 Drawing Sheets

(56) References Cited

U.S. PATENT DOCUMENTS

| | | | | |
|---|---|---|---|---|
| 10,791,836 B2* | 10/2020 | Holt | ............. | G06F 1/1686 |
| 2006/0284045 A1* | 12/2006 | Conibear | ............. | A47B 23/02 |
| | | | | 248/441.1 |
| 2008/0142675 A1* | 6/2008 | Lu | ............. | F16M 11/22 |
| | | | | 248/676 |
| 2015/0054273 A1* | 2/2015 | Harris | ............. | B42F 7/04 |
| | | | | 281/29 |
| 2015/0195392 A1* | 7/2015 | Nissenbaum | ............. | H04M 1/04 |
| | | | | 455/569.1 |
| 2015/0358515 A1* | 12/2015 | Resnick | ............. | F16M 11/041 |
| | | | | 24/3.12 |
| 2016/0142523 A1* | 5/2016 | Bartkowski | ............. | F16M 13/022 |
| | | | | 248/441.1 |
| 2018/0008044 A1* | 1/2018 | Holt | ............. | G06F 1/1605 |

OTHER PUBLICATIONS https://www.cdw.com/content/cdw/en/articles/hardware/tablet-size-comparison-chart.html Accessed on Jan. 4, 2022 (Year: 2021).*

* cited by examiner

TABLET AND SMARTPHONE HOLDER FOR VIDEO AND PHOTO SHOOTING

BACKGROUND OF INVENTION

Summary of Invention

The tablet and smartphone holder has a clear, flat and stiff front panel and a back panel which are joined together at their bases by an axis, which passes through both of their bases and has a spring. The back panel pivots on the axis and presses against the front panel or presses a tablet or a smartphone against the front panel by the action of the spring. The screen of the tablet or smartphone can be seen clearly through the clear front panel while photo and video shooting is underway. The clear front panel covers part of the screen of a smartphone or tablet without obstructing the camera icon.

With the pressure exerted by the back panel on a tablet or smartphone and generated by the spring on the axis, the holder can hold a tablet or smartphone securely, regardless of its size.

Another part of the design is a stand for the tablet and smartphone holder. The upper part of the stand has a ball joint with a threaded small rod. which screws into the threaded hole in the base of the front panel. The stand widens conically at its base, to which is attached a rubber pad which extends beyond the edge of the stand, forming a circular flap around the base.

DETAILED DESCRIPTION OF THE DRAWINGS

Figure 1:
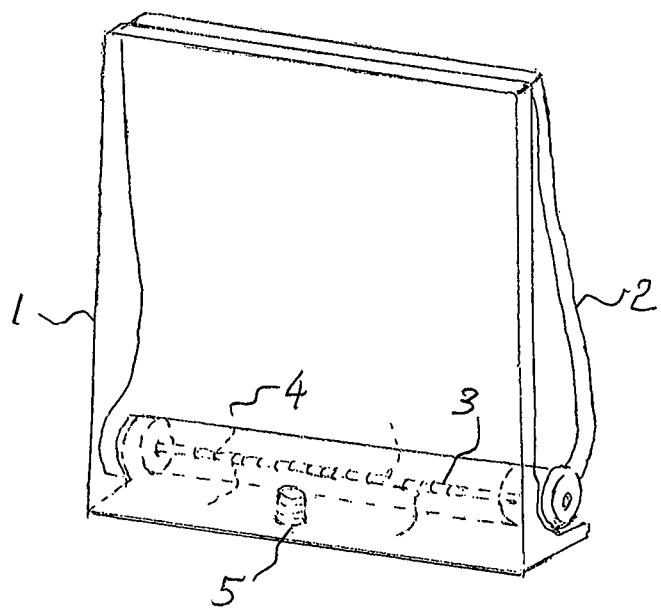
FIG. 1. The front view of the tablet and smartphone holder.

FIG. 1 demonstrates the front view of the tablet and smartphone holder, It has a clear, stiff flat front panel and a back panel 2. Both of them are joined together at their bases by an axis 3, which passes through both of their bases and aligns them. The base of the back panel is round on both sides, which pivots on the axis, which has a spring 4. The back panel 2 presses against the clear front panel or presses a tablet or a smartphone against the clear front panel by the action of the spring 4 on the axis. The screen of the tablet or smartphone can be seen clearly through the clear front panel while photo and video shooting is underway. The clear front panel covers part of the screen of a smartphone or tablet without obstructing the camera icon.

The base of the front clear panel has a threaded hole 5 embedded in it to attach to the stand show or a selfie stick/tripod (not shown). The threaded hole is visible through the clear material from which the front panel and its base is made.

Figure 2:
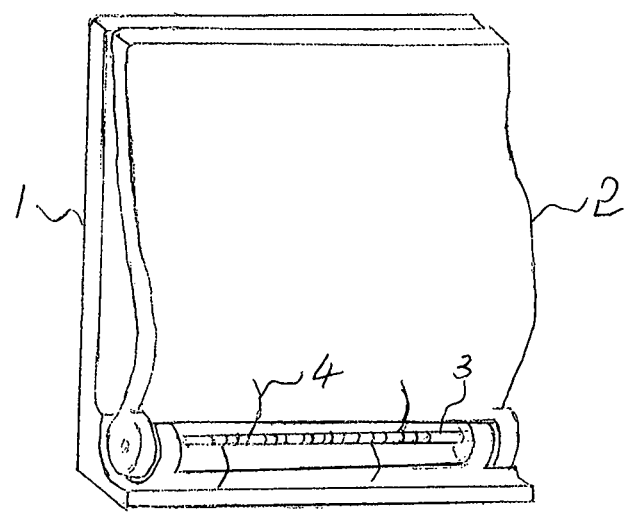
FIG. 2 The rear view of the tablet and smartphone holder.

FIG. 2 demonstrates the rear view of the tablet and smartphone holder. The spring 4 on the axis 3 presses on the back panel of the tablet and smartphone holder. The axis passes through and aligns the round base of the back panel and the round base of front panel.

Figure 3:
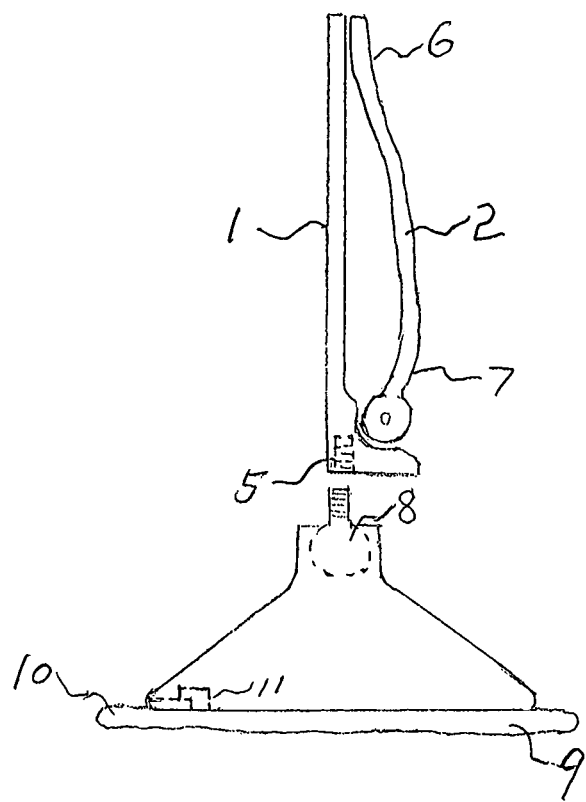
FIG. 3. The side view of the tablet and smartphone holder and its stand.
Figure 4:
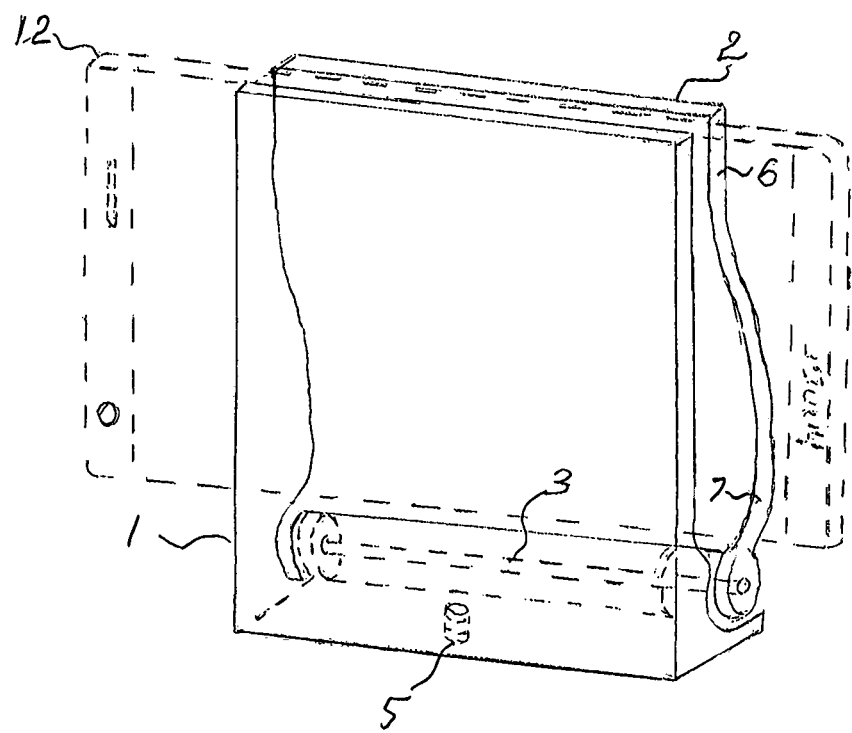
FIG. 4. The smartphone and tablet holder holding the smartphone

FIG. 3. demonstrates the side view of the tablet and smartphone holder. A threaded hole 5 is embedded in the base of the front panel.

The upper segment 6 of back panel is near vertical in its closed position so that it becomes vertical when open and its surface can squarely press against the back of a tablet or smartphone. The lower segment 7 of back panel is curved and widens posteriorly, which accommodates various thickness of tablets and smartphones and causes a tablet or smartphone to slide down and rest against the flat surface of the clear front pan.

The upper part of the stand has a ball joint 8 with a threaded small rod, which screws into the threaded hole 5 in the base of the front panel 1. The stand widens conically towards its base. To the base is detachably attached a rubber pad 9 which extends beyond the edge of the stand, forming a circular flap 10 around the base. The circular rubber flap 10 can conform to the non-flat surface of a dashboard. The rubber pad 9 and its extended edge or the circular flap can be attached to the dashboard with glue. Thus, a smartphone can be used as a dashcam, The base of the stand can be detachably joined to the rubber pad with ridges 11 on the base engaging slots in the rubber pad. Alternatively, more than one suction cups can substitute the rubber pad on the base of the stand.

The ball joint on the stand of the tablet and smartphone holder allows upward, downward arid 360 degree horizontal shooting when a tablet or smartphone is used for selfie or as a dashcam.

What is claimed:

1. A tablet or smartphone supporting system, the supporting system comprising:
a tablet or smartphone;
a tablet or smartphone holder; the tablet or smartphone holder comprising:
a clear, stiff, flat, upright front panel with a base portion; the base portion including a concave round section and a threaded hole through a bottom surface of the base portion;
a back panel which includes an upper segment, a curved lower segment and a convex round base; the convex round base of the back panel fits into the concave round section of the front panel and is secured therein by a spring biased pivot axis; the lower segment of the back panel curves backward away from the upper segment and then forwards towards the concave round section of the front panel; the curved lower segment accommodates various thicknesses of the tablet or smartphone and causes the tablet or smartphone to slide down and rest against the front panel such that free movement of the tablet or smartphone is restricted;
a stand secured to front panel; the stand comprising:
a stand body which widens conically in a downward direction;
a ball joint positioned on a top section of the stand body which has a threaded small rod that secures to the threaded hole of the base portion;
the ball joint permitting upward, downward and 360 degree horizontal shooting of the tablet or smartphone; and
a rubber pad which extends beyond an edge of the stand body forming a circular flap around the stand body; the circular flap configured to conform to a non-flat supporting surface; wherein the rubber pad is secured to the stand body via ridges located on the stand body that engage slots on the rubber pad; and wherein the tablet or smartphone is positioned between the front panel and the back panel with a screen of the tablet or smartphone pressed solidly against the front panel thereby enabling the screen to be viewable through the front panel; the spring biased pivot axis exerts a forward pressure on the back panel which securely holds the tablet or smartphone within the tablet or smartphone holder.

\* \* \* \* \*